US010027648B2

(12) United States Patent
Bowman et al.

(10) Patent No.: US 10,027,648 B2
(45) Date of Patent: *Jul. 17, 2018

(54) GEOLOCATION DEPENDENT VARIABLE AUTHENTICATION

(71) Applicant: International Business Machines Corporation, Armonk, NY (US)

(72) Inventors: Stephen D. Bowman, Monroe, NC (US); Philip E. Parker, York, SC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/662,316

(22) Filed: Jul. 28, 2017

(65) Prior Publication Data

US 2018/0083943 A1 Mar. 22, 2018

Related U.S. Application Data

(63) Continuation of application No. 15/268,675, filed on Sep. 19, 2016.

(51) Int. Cl.
*H04L 29/06* (2006.01)
*G06F 21/44* (2013.01)
*G06F 21/62* (2013.01)

(52) U.S. Cl.
CPC .............. *H04L 63/08* (2013.01); *G06F 21/44* (2013.01); *G06F 21/62* (2013.01); *H04L 63/107* (2013.01);
(Continued)

(58) Field of Classification Search
CPC ....... H04L 63/08; H04L 63/107; G06F 21/44; G06F 21/62
(Continued)

(56) References Cited

U.S. PATENT DOCUMENTS 7,000,116 B2   2/2006   Bates et al.
7,196,661 B2   3/2007   Harvey
(Continued)

FOREIGN PATENT DOCUMENTS

JP        2004118456 A        4/2004

OTHER PUBLICATIONS

Bowman et al., "Geolocation Dependent Variable Authentication", U.S. Appl. No. 15/268,675, 34 pages.
(Continued)

*Primary Examiner* — Dant B Shaifer Harriman
(74) *Attorney, Agent, or Firm* — Bryan D. Wells

(57) ABSTRACT

In an approach to variable authentication, one or more computer processors receive a request to access secure data from a computing device. The one or more computer processors receive geolocation data associated with the computing device. The one or more computer processors compare the geolocation data to authentication parameters associated with the computing device to determine if the geolocation data falls within the authentication parameters. The one or more computer processors determine whether the geolocation data falls within the authentication parameters. If the geolocation data does not, the one or more computer processors send a request for authentication from the computing device via an authentication method wherein the authentication method corresponds to an identified location and time of the computing device associated with the request to access secure data and a time associated with the request to access secure data. The one or more computer processors receive the authentication.

1 Claim, 3 Drawing Sheets

(52) U.S. Cl.
CPC ............... *G06F 2221/2111* (2013.01); *G06F 2221/2151* (2013.01)

(58) Field of Classification Search
USPC .......................................................... 726/7
See application file for complete search history.

(56) References Cited

U.S. PATENT DOCUMENTS

| | | | |
|---|---|---|---|
| 7,372,839 | B2 | 5/2008 | Relan et al. |
| 8,095,112 | B2 | 1/2012 | Chow et al. |
| 8,881,263 | B2 | 11/2014 | Hewinson |
| 9,419,980 | B2* | 8/2016 | Hewinson ............... H04L 63/10 |
| 2002/0137524 | A1 | 9/2002 | Bade et al. |
| 2006/0166679 | A1 | 7/2006 | Karaoguz et al. |
| 2011/0320116 | A1* | 12/2011 | DeMaio ............. G01C 21/3638 701/457 |
| 2012/0144451 | A1* | 6/2012 | Gutt ........................ H04L 45/00 726/3 |
| 2014/0208397 | A1 | 7/2014 | Peterson |
| 2014/0222570 | A1* | 8/2014 | DeVolites ............. H04W 4/029 705/14.58 |
| 2015/0032621 | A1* | 1/2015 | Kar .................... G06Q 20/4016 705/44 |
| 2015/0050922 | A1 | 2/2015 | Ramalingam et al. |
| 2015/0201298 | A1* | 7/2015 | Zhang ................... H04W 64/00 455/456.1 |
| 2015/0242605 | A1 | 8/2015 | Du et al. |
| 2015/0371064 | A1 | 12/2015 | Dayan et al. |
| 2016/0099923 | A1 | 4/2016 | Golla et al. |
| 2016/0127384 | A1* | 5/2016 | VoBa ...................... G06F 21/53 726/7 |
| 2016/0315947 | A1 | 10/2016 | Boss et al. |
| 2016/0321649 | A1* | 11/2016 | Dragushan ........... G06Q 20/342 |
| 2017/0134905 | A1* | 5/2017 | Venkatesan ........... H04W 4/025 |
| 2017/0323259 | A1* | 11/2017 | Gillen ................ G06Q 10/0833 |

OTHER PUBLICATIONS

Appendix P, List of IBM Patents or Patent Applications Treated as Related, 2 pages, dated Jul. 31, 2017.
"Method for Improving Security of a Mobile Device Using Location Determination Technologies", An IP.com Prior Art Database Technical Disclosure, Authors et. al.: IBM, Original Publication Date: Apr. 22, 2009, IP.com No. IPCOM000182023D, IP.com Electronic Publication Date: Apr. 22, 2009, 3 pages.

* cited by examiner

GEOLOCATION DEPENDENT VARIABLE AUTHENTICATION

BACKGROUND OF THE INVENTION

The present invention relates generally to the field of information security technology, and more particularly to enhanced authentication security using geolocation.

Client computing device tracking is the ascertaining of the position or location of the client computing device, whether stationary or moving. Localization may occur either via a global positional system (GPS) or via multilateration of radio signals between several cell towers of the network and the device, i.e., a navigation technique based on the measurement of the difference in distance to two stations at known location that broadcast signals at known times. To locate a client computing device using multilateration of radio signals, the client computing device must emit at least a roaming signal to contact the next nearby antenna tower.

Authentication of a user requires the user to input one or more factors of authentication. Three major factors include: verification by something the user knows, such as a password, or a personal identification number (PIN); something the user has, such as a smart card, a security fob, a hardware or virtual token, or a digital certificate; and something the user is, such as a biometric characteristic, e.g., a fingerprint, a facial image, a retinal pattern, a voiceprint, etc.

SUMMARY

Embodiments of the present invention disclose a method, a computer program product, and a system for variable authentication. The method includes one or more computer processors receiving a request to access secure data from a computing device. The one or more computer processors receive geolocation data associated with the computing device. The one or more computer processors compare the geolocation data to one or more authentication parameters associated with the computing device to determine if the geolocation data falls within one or more authentication parameters. The one or more computer processors determine whether the geolocation data falls within the one or more authentication parameters. In response to determining the geolocation data does not fall within the one or more authentication parameters, the one or more computer processors send a request for authentication from the computing device via an authentication method wherein the authentication method corresponds to an identified location and an identified time of the computing device associated with the request to access secure data and a time associated with the request to access secure data from the computing device. The one or more computer processors receive the authentication.

DETAILED DESCRIPTION

The present-day prevalence and continued proliferation of client computing devices creates a high risk of property and data theft. As such, client computing devices commonly allow for authentication measures, to better secure the client computing device and the content stored on the client computing device from being accessed by illegitimate parties, and geolocation services to track the location of a lost or stolen client computing device. Illegitimate parties include, but are not limited to, those interested in perpetrating property theft, identity theft, and fraud. Despite the security benefits of using longer passwords and/or multiple security options, client computing device users often opt to use minimal authentication options including, but not limited to, a non-existent or short password to avoid inconveniences created by requiring increasingly complex or numerous authentication inputs. For example, a user may be inconvenienced by the extra time and difficulty required to input longer passwords on a small screen. Unfortunately, the additional convenience to the user of simpler authentication methods also creates vulnerabilities that can be exploited to facilitate property theft, identity theft, and fraud by illegitimate parties.

A system that allows for variability in the level of authentication required to access the client computing device based on geolocation data balances the user's interest in convenient access where and when the user most often uses a client computing device with the user's security interest in preventing illegitimate parties from accessing the client computing device outside the user's normal locations. Furthermore, the integration of geolocation data in client computing device security allows the user to track the location of the client computing device to facilitate recovery of the device and device data in the event of a breach. Embodiments of the present invention recognize that the balance between user convenience and security in client computing devices may be improved by utilizing geolocation data from the user's device to vary authentication requirements based on a configurable radius and a configurable time frame. Implementation of embodiments of the invention may take a variety of forms, and exemplary implementation details are discussed subsequently with reference to the Figures.

Figure 1:
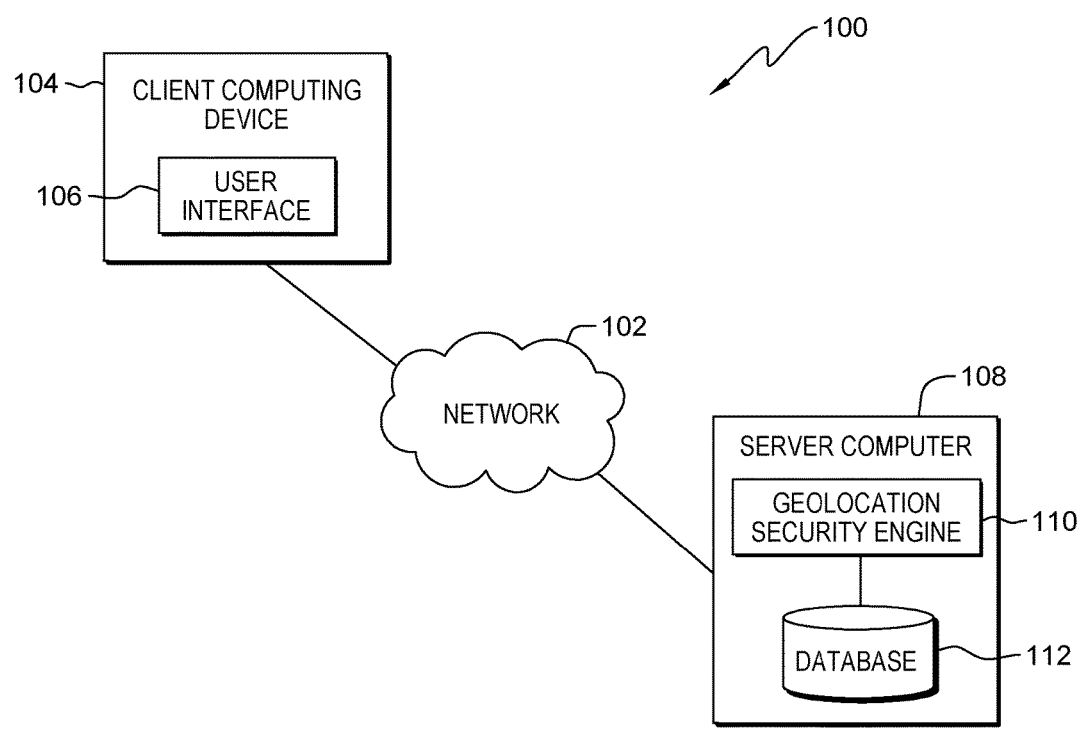
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic computing device capable of communicating with various components and devices within distributed data processing environment 100, via network 102. In general, client computing device 104 represents any programmable electronic computing device or combination of programmable electronic computing devices capable of executing machine readable program instructions and communicating with server computer 108 and other computing devices (not shown) within distributed data processing environment 100 via a network, such as network 102. Client computing device 104 includes an instance of user interface 106.

User interface 106 provides an interface to geolocation security engine 110 on server computer 108 for a user of client computing device 104. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. In an embodiment, user interface 106 enables the user of client computing device 104 to register with and configure geolocation security engine 110 to enable tracking of the geolocation data of client computing device 104. In another embodiment, user interface 106 may enable the user of client computing device 104 to provide authentication parameters to geolocation security engine 110. Authentication parameters may include, but are not limited to, a user designated password, a user designated time frame for access, a device location allowed by a user, and a user-determined access radius around allowed device locations.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes geolocation security engine 110 and database 112. Server computer 108 may include internal and external hardware components, as depicted and described in further detail with respect to FIG. 3.

Geolocation security engine 110 receives geolocation data from a client computing device, such as client computing device 104, and determines a corresponding level of authentication required to access client computing device 104 based on configurable authentication parameters. In one embodiment, geolocation security engine 110 acquires authentication parameters, such as previously saved and/or independently calculated authentication parameters, associated with client computing device 104. Geolocation security engine 110 determines the required authentication based on the geolocation data and the authentication parameters associated with client computing device 104. Geolocation security engine 110 requests the required authentication from the user, via user interface 106. Geolocation security engine 110 determines whether the authentication meets criteria defined by the authentication parameters. If the received user entered authentication meets criteria, then geolocation security engine 110 authorizes the authentication thereby granting the user access to client computing device 104. In one embodiment, if the received user entered authentication does not meet criteria, then geolocation security engine 110 may perform actions including, but not limited to, device security measures such as locking and recording the movement of client computing device 104. In an alternate embodiment, if the received user entered authentication does not meet criteria, then geolocation security engine 110 may perform any other security measures utilized by one skilled in the art. Geolocation security engine 110 may query a user regarding whether to store geolocation data. In another embodiment, geolocation engine 110 may automatically store geolocation data upon successful authentication. Geolocation security engine 110 is depicted and described in further detail with respect to FIG. 2.

Database 112 is a repository for data used by geolocation security engine 110. In the depicted embodiment, database 112 resides on server computer 108. In another embodiment, database 112 may reside elsewhere within distributed data processing environment 100 provided geolocation security engine 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 stores geolocation data and authentication parameters of a client computing device, such as client computing device 104. Database 112 also stores registration and configuration data input by a user of client computing device 104 via user interface 106. Database 112 may also store data associated with the historical movement of client computing device 104.

Figure 2:
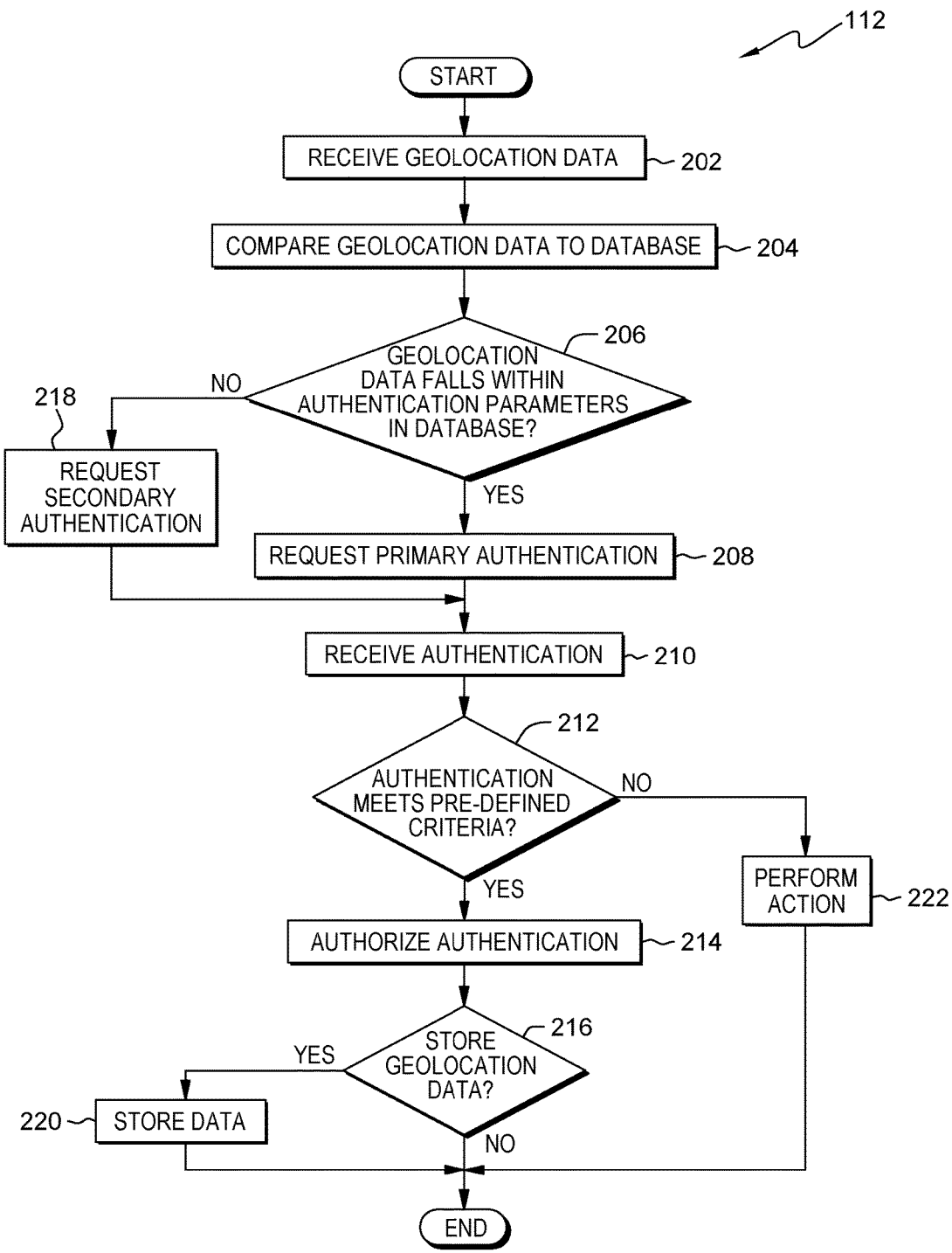
FIG. 2 is a flowchart depicting operational steps of a geolocation security engine, on a server computer within the distributed data processing environment of FIG. 1, for determining geolocation data and dynamically adapting security measures in response to a configurable radius, in accordance with an embodiment of the present invention.

FIG. 2 is a flowchart depicting operational steps of geolocation security engine 110, on server computer 108 within distributed data processing environment 100 of FIG. 1, for determining geolocation data and dynamically adapting security measures in response to a configurable radius, in accordance with an embodiment of the present invention.

Geolocation security engine 110 receives geolocation data from client computing device 104 (step 202). Geolocation data may include one or more of a plurality of data categories associated with the location of client computing device 104 including, but not limited to, geographic coordinates, location-dependent time stamps, and location frequency. For example, geolocation data may include geographic coordinates of the physical location of client computing device 104. In another example, geolocation data may include a time stamp of an authentication attempt or successful authentication by the user. In another example, geolocation data may include the frequency of visits to a particular location by recording the metadata associated with client computing device 104 and recording each subsequent visit to the particular location within a user-defined, client computing device-defined, or geolocation security engine-defined radius. Client computing device 104 determines geolocation data via one of a plurality of location tracking technologies known in the art which is subsequently sent to geolocation security engine 110. For example, client computing device 104 may use a global positioning system (GPS) capability integrated within the device to determine the location of client computing device 104. In another embodiment, client computing device 104 may use a positioning system limited to a predetermined area to determine the location of client computing device 104 within the area. In another embodiment, client computing device 104 may use wireless fidelity technology (WiFi) to determine the location of client computing device 104. In another embodiment, any location tracking technology or combination thereof may determine the location of client computing device 104.

Geolocation security engine 110 may receive and begin recording geolocation data following successful authentication of the client computing device 104. For example, geolocation security engine 110 may record the daily locations to which a user travels while client computing device 104 is unlocked and automatically store the geolocation data in database 112. In another embodiment, geolocation security engine 110 may obtain particular geolocation data at regular time intervals. In yet another embodiment, geolocation security engine may obtain particular geolocation data continuously. In another embodiment, geolocation security engine 110 may obtain additional geolocation data when client computing device 104 falls within pre-defined authentication parameters. Pre-defined authentication parameters may include, but are not limited to, allowed client computing device locations, time frames for access, and acceptable geographic radii for access around an allowed location. For example, geolocation security engine 110 determines that client computing device 104 falls within authentication parameters, such as a device location allowed by the user, and then obtains time stamp data to determine whether client computing device 104 also falls within a user designated time frame for access. However, geolocation security engine 110 is not limited to any particular embodiment and may obtain geolocation data in any configurable manner.

Geolocation security engine 110 compares the geolocation data to configuration policies stored in database 112 (step 204). Configuration policies that determine access to client computing device 104 may include, but are not limited to, previously allowed locations, configurable radii around registered locations, time frames associated with particular locations, and frequently traveled routes between allowed locations. Furthermore, a user may also set configuration policies that determine an action to take in the event of a potentially unauthorized user attempting to access client computing device 104, which will be discussed in further detail with regard to step 222. Additionally, a user may modify configuration policies and authentication parameters at the user's discretion. In an embodiment, the first time a user accesses user interface 106, geolocation security engine 110 may query the user to configure initial authentication parameters corresponding to configuration policies including, but not limited to, allowed geographic locations, multiple password inputs, acceptable geographic radii for access, and allowable time frames.

Authentication parameters corresponding to configuration policies may be stored in database 112 in a primary authentication category that defines authentication inputs that satisfy immediate access requirements for client computing device 104 or secondary authentication categories for authentication inputs that do not satisfy immediate access requirements for client computing device 104. For example, a user may configure a list of allowed geographic locations stored in the primary authentication category of the configuration policies, such as the user's home and work geographic coordinates, the first time the user accesses user interface 106. In another example, a user may configure a list of allowed internet protocol (IP) addresses in the primary authentication category, such as the user's home and work IP addresses. In yet another example, a user may input a password for primary authentication and a security question for a secondary authentication zone in an initial configuration policy. In yet another example, a user may configure a time policy that only allows access to client computing device 104 in specified geographic locations between 9:00 a.m. and 5:00 p.m. as primary authentication in an initial configuration policy. In an embodiment, geolocation security engine 110 stores user inputted authentication parameters corresponding to configuration policies in database 112. In one embodiment, the initial configuration period may be limited by a pre-defined number of unique locations where a user accesses client computing device 104. In another embodiment, the initial configuration period may require a pre-defined number of successful accesses to client computing device 104 in a location before adding the location to the primary authentication category. In an alternative embodiment, user interface 106 is pre-configured with default authentication parameters.

Due to the privileged nature of client computing device 104, geolocation security engine 110 compares the previously determined geolocation data to configuration policies stored in database 112. In one embodiment, a configuration policy may exist in database 112 that pre-defines authentication parameters, such as coordinates for a geographic location or a geographic radius within which client computing device 104 must be located to gain access. For example, a configuration policy may only allow a user to access client computing device 104 within 500 feet of geographic locations stored in database 112. In another embodiment, a configuration policy may exist in database 112 that pre-defines authentication parameters, such as a specific time frame or duration for a geographic location or a geographic radius within which the device must be located to gain access. For example, a configuration policy may only allow a user to access client computing device 104 between the hours of 9:00 a.m. and 5:00 p.m. In another example, a configuration policy may only allow a user to access client computing device 104 after fifteen minutes have elapsed since the user arrived at the location.

Geolocation security engine 110 determines whether the geolocation data falls within authentication parameters stored in database 112 (decision block 206). Based on the configuration policies stored in database 112, geolocation security engine 110 recognizes whether the determined geolocation data falls within the authentication parameters. In one embodiment, geolocation security engine 110 determines whether the geolocation data of client computing device 104 is within a configurable geographic radius around pre-authorized locations stored in database 112. In another embodiment, geolocation security engine 110 determines whether the time stamp and geographic location of client computing device 104 are within an authorized time frame associated with the geographic location and an acceptable geographic radius for access around the geographic location. Geolocation security engine 110 is not limited to the examples discussed herein and may use any configuration policy to determine whether geolocation data from client computing device 104 falls within configuration policies stored in database 112.

If geolocation security engine 110 determines that the geolocation data falls within authentication parameters stored in database 112 ("yes" branch, decision block 206), then geolocation security engine 110 requests primary authentication (step 208). Primary authentication includes a pre-configured authentication method designated for geolocation data that falls within the authentication parameters of the primary authentication category stored in database 112. For example, primary authentication may be a simple authentication method, such as a short password or personal identification number (PIN), for when a user attempts to access any one or combination of client computing device 104, the device's software, and the device's data within an acceptable geographic radius for access around an allowed location. However, primary authentication is not limited by the embodiments contained herein and may present any authentication method of any form and difficulty.

In one embodiment, if the geolocation data falls within the authentication parameters of the primary authentication category stored in database 112, such as an acceptable geographic radius for access around an allowed location, then geolocation security engine 110 requests primary authentication from a user, via user interface 106, to grant access to any one or combination of client computing device 104, software on client computing device 104, one or more profiles on client computing device 104, and data on client computing device 104. In another embodiment, if the geolocation data falls within the authentication parameters such as an allowed location and time frame for the location, then geolocation security engine 110 requests primary authentication from a user to grant access to any one or combination of client computing device 104, the device's software, and the device's data. In an alternative embodiment, within a period of initial configuration, geolocation security engine 110 allows primary authentication to be used in any location and then adds locations where client computing device 104 has been accessed to the primary authentication category in database 112. For example, the initial configuration may be a pre-defined time frame after the user first accesses any one or combination of client computing device 104, the device's data, or the device's software.

In another embodiment, if client computing device 104 falls near or on the edge a geographic radius for primary authentication, then the geographic radius for primary authentication expands to add the acceptable geographic radius around the geolocation of the successful primary authentication. For example, if a user inputs successful primary authentication one foot from the outer perimeter of the acceptable radius around an allowed location and the acceptable radius for primary authentication is configured to be 200 feet in the primary authentication category in database 112, then a radius of 200 feet around the geolocation of the successful primary authentication is added to authentication parameters for primary authentication. In some examples, a user of client computing device 104 may preset maximum radii for a singular geographical location. If a maximum radii has already been reach, then geolocation security engine 110 may create a new center point with a new radius even though the new radius overlaps with a previous point's radius.

If geolocation security engine 110 determines that the geolocation data does not fall within authentication parameters store in database 112 ("no" branch, decision block 206), then geolocation security engine 110 requests secondary authentication (step 218). Secondary authentication includes a pre-configured authentication method designated for geolocation data that falls outside of the primary authentication category stored in database 112. For example, secondary authentication may be a different authentication method, such as a different password, a more complex password, or multi-factor authentication requiring two or more types of authentication, when a user attempts to access client computing device 104 outside of a configured acceptable radius around an allowed location. In another example, secondary authentication may include multiple authentication inputs that require a user to input one or more of the aforementioned secondary authentication methods in addition to primary authentication.

In an embodiment, geolocation engine 110 may query a user for a more complex password than the password for primary authentication. For example, geolocation security engine 110 may query the user to input a password containing more characters, different types of characters, or multiple authentication inputs. In another embodiment, geolocation security engine 110 may query a user to answer one or more pre-defined security questions to grant access to client computing device 104. In another embodiment, geolocation security engine 110 may query a user to input two or more types of authentication to grant access to client computing device 104. For example, geolocation security engine 110 may query the user possessing client computing device 104 outside the primary authentication area to input a second password to access the device. In another example, geolocation security engine 110 may query the user possessing client computing device 104 outside the primary authentication area to input a password and answer a security question to access the device. However, secondary authentication is not limited by the embodiments contained herein and may present any authentication method of any form and difficulty. Additionally, the secondary authentication can be further divided into additional authentication subcategories. For example, there may be tertiary and quaternary authentication radii from an allowed location. In another example, there may be tertiary and quaternary authentication methods required depending on a user attempts to access. Each level of authentication may require a different authentication method.

In one embodiment, geolocation security engine may require different authentication methods depending on the distance from an allowed location. For example, geolocation security engine 110 may require a simple password within 100 feet of an allowed location, a more complex password between 100 feet and 300 feet of an allowed location, and a very complex password from 300 feet to 600 feet of an allowed location. In another related embodiment, geolocation security engine 110 may require different authentication methods depending on the device, software, or data the user is trying to access. For example, geolocation security engine 110 may require a simple password to access contacts on client computing device 104, a more complex password to access pictures on the device, and a very complex password to access emails on the device. In yet another related embodiment, geolocation may require different authentication methods depending client computing device 104's distance from an allowed location and depending on the device, software, or data. For example, geolocation security engine 110 may have different authentication requirements for different types of data on the device, and each different type of data may have a respective primary, secondary, tertiary, and quaternary authentication method depending on the distance of client computing device 104 from an allowed location.

In another embodiment, if the geolocation data falls outside the authentication parameters for primary authentication, such as an allowed location and time frame for the location, then geolocation security engine 110 requests secondary authentication from a user to access client computing device 104. In another embodiment, if the geolocation data falls outside the authentication parameters for primary authentication such as an allowed location, time frame, and frequency of visits for the location, then geolocation security engine 110 requests secondary authentication from a user to grant access client computing device 104. In another embodiment, if the geolocation data falls within some configuration policies for primary authentication but falls outside of at least one policy, then geolocation security engine 110 requests secondary authentication from a user to grant access to client computing device 104.

Responsive to requesting primary or secondary authentication, geolocation security engine 110 receives data related to the authentication request from a user (step 210). In an embodiment, the user inputs primary or secondary authentication via user interface 106 and sends the data to geolocation security engine 110. In another embodiment, geolocation security engine 110 may receive authentication data from another source (not shown).

Geolocation security engine 110 determines whether the authentication meets pre-defined criteria (decision block 212). Geolocation security engine 110 confirms whether the received authentication matches the configuration policies for geolocation data falling in primary or secondary authentication categories. An example of a pre-defined criteria is a password input that matches a password stored in database 112 for the particular policies associated with the geographic location and time frame of the user.

If geolocation security engine 110 determines the authentication meets pre-defined criteria ("yes" branch, decision block 212), then geolocation security engine 110 authorizes the authentication (step 214). In one embodiment, authorizing the authentication unlocks client computing device 104 for use. In another embodiment, authorizing the authentication allows a user to access particular data associated with the authentication.

Responsive to authorizing the authentication, geolocation security engine 110 determines whether to store the geolocation data (step 216). In an embodiment, following successful secondary authentication, geolocation security engine 110 queries the user, via user interface 106, to select whether to store the current location in association with the primary authentication category. In another embodiment, geolocation security engine 110 may automatically store the current device location as a primary authentication zone after successful secondary authentication. In another embodiment, geolocation security engine 110 may use machine learning to track frequently used travel routes between locations and automatically store the routes as a primary authentication zone. In another embodiment, geolocation security engine 110 may automatically store a location and an acceptable geographic radius for access around the location as a primary authentication zone after a pre-defined number of successful secondary authentications at that location. Geolocation security engine 110 may automatically update past locations for frequency, last visited time, and duration of visit.

If geolocation security engine 110 determines to store the data ("yes" branch, decision block 216), then geolocation security engine 110 stores the data (step 220). In one embodiment, geolocation security engine 110 stores the data in database 112. In another embodiment, geolocation security engine stores the data on client computing device 104. In yet another embodiment, client computing device 104 automatically transmits the geolocation data as metadata to geolocation security engine 110 upon a user's initial access request.

If geolocation security engine 110 determines not to store the data ("no" branch, decision block 216), then geolocation security engine 110 ceases operations.

If geolocation security engine 110 determines the authentication does not meet the pre-defined criteria ("no" branch, decision block 212), then geolocation security engine 110 performs one or more actions (step 222). When the received primary or secondary authentication fails, geolocation security engine 110 performs previously configured measures. A failure of primary or secondary authentication may be indicative of an unauthorized user attempting to access client computing device 104. In one embodiment, geolocation security engine 110 implements security measures upon the unsuccessful authentication of client computing device 104. In another embodiment, geolocation security engine 110 may be configured to allow multiple unsuccessful authentication attempts before taking action. In one embodiment, geolocation security engine 110 sends an alert to another computing device, such as an email to the user's personal computer or text to the user's mobile device, notifying the user of the unsuccessful attempt to access the device. In another embodiment, geolocation security engine 110 may begin recording the geolocation data of client computing device 104 at regular intervals and either store the data for later analysis or send the data to an authorized user. The stored geolocation data may be accessed immediately or at a later time and may be used to prosecute an unauthorized user or assist in the recovery of the client computing device 104. In another embodiment, geolocation security engine 110 notifies designated authorities of the unsuccessful authentication. In another embodiment, geolocation security engine 110 deletes some or all of the device data, as previously configured, to protect the privacy of the authorized user. In another embodiment, geolocation security engine 110 gives the user the option of remotely deleting some or all of the data on the device by contacting the user through alternative means. For example, the alternative means can be in the form of an email or text message to an authorized user's phone or computer. In another embodiment, geolocation security engine 110 may automatically delete some or all of the data on the device. In yet another embodiment, geolocation may execute any combination of the preceding examples based on configuration policies stored in database 112.

Figure 3:
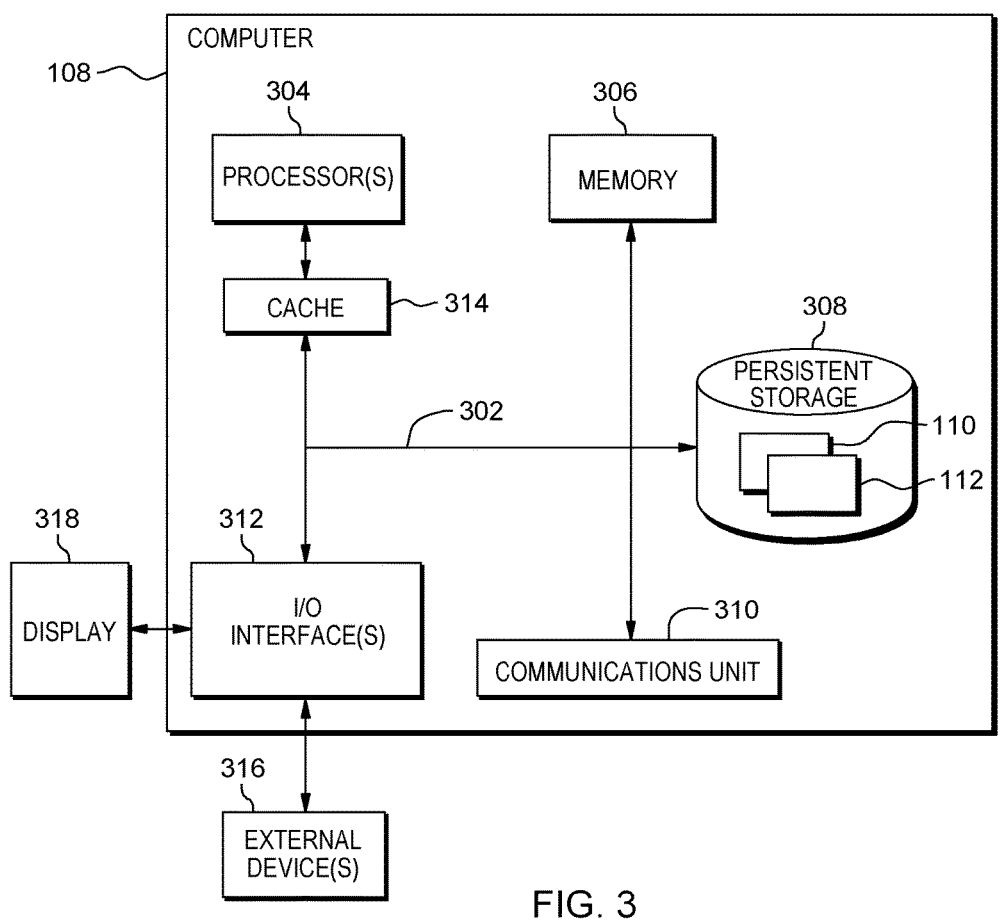
FIG. 3 depicts a block diagram of components of the server computer executing the geolocation security engine within the distributed data processing environment of FIG. 1, in accordance with an embodiment of the present invention.

FIG. 3 depicts a block diagram of components of server computer 108 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 108 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., geolocation security engine 110 and database 112, are stored in persistent storage 308 for execution and/or access by one or more of the respective processor(s) 304 of server computer 108 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104. In these examples, communications unit 310 includes one or more network interface cards. Communications unit 310 may provide communications through the use of either or both physical and wireless communications links. Geolocation security engine 110, database 112, and other programs and data used for implementation of the present invention, may be downloaded to persistent storage 308 of server computer 108 through communications unit 310.

I/O interface(s) 312 allows for input and output of data with other devices that may be connected to server computer 108. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., geolocation security engine 110 and database 112 on server computer 108, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for variable authentication, the method comprising:
   receiving, by one or more microprocessors, a request to access secure data from a computing device;
   identifying, by the one or more microprocessors, data associated with the request to access the secure data from the computing device, wherein the identified data includes geographical coordinates of the computing device representing the geographical coordinates of the computing device upon making the request to access the secure data and a time stamp corresponding to a time at which the request to access the secure data was made;
   identifying, by the one or more microprocessors, geographic coordinates corresponding to a location that is classified as an allowed location;
   identifying, by the one or more microprocessors, a first threshold radius from the allowed location, a second threshold radius from the allowed location, and a third threshold radius from the allowed location, wherein:
      the second threshold radius is greater than the first threshold radius and the third threshold radius is greater than the second threshold radius; and
      the first threshold radius is associated with a primary authentication zone, the second threshold radius is associated with a secondary authentication zone, and the third threshold radius is associated with a tertiary authentication zone, wherein:
         the primary authentication zone is associated with a primary authentication method including a first password type having a first minimum password length, the secondary authentication zone is associated with a secondary authentication method including a second password type having a second minimum password length, and the tertiary authentication zone is associated with a tertiary authentication method including a third password type having a third minimum password length, wherein the second minimum password length is longer the first minimum password length and the third minimum password length is longer than the second minimum password length; and
   in response to determining, by the one or more microprocessors, that a distance between the geographical coordinates of the computing device and the allowed location is less than the third threshold radius:

requesting, by the one or more microprocessors, an authentication in accordance with the secondary authentication method;
receiving, by the one or more microprocessors, the authentication;
in response to determining, by the one or more microprocessors, that the authenticating meets pre-defined criteria associated with the secondary authentication method, authorizing, by the one or more computer processors, the request to access secure data;
identifying, by the one or more microprocessors, a count of requests to access secure data associated with the geographical coordinates of the computer devices; and
in response to determining, by the one or more microprocessors, that the count of requests to access the secure data exceeds a threshold count, classifying the geographical coordinates of the computer device as an allowed location.

* * * * *